May 17, 1966  TATSUYA ICHIHARA ETAL  3,251,227

METHOD FOR MEASURING MASS AND MASS FLOW

Filed Aug. 7, 1963

INVENTORS.
TATSUYA ICHIHARA
ICHIRO IDO
BY
*Arthur H. Swanson*
ATTORNEY.

United States Patent Office 3,251,227
Patented May 17, 1966

---

3,251,227
METHOD FOR MEASURING MASS AND MASS FLOW
Tatsuya Ichihara, Nerima-ku, Tokyo, and Ichiro Ido, Hodogaya-ku, Yokohama, Japan, assignor to Honeywell Inc., a corporation of Delaware
Filed Aug. 7, 1963, Ser. No. 300,430
Claims priority, application Japan, Aug. 14, 1962, 37/33,664
4 Claims. (Cl. 73—209)

This invention relates to a method for measuring a mass and a mass flow, and more particularly a method and an apparatus which can measure the mass and the mass flow of a fluid only by measuring the velocity of the fluid which is passing through a tapered tube.

In the conventional mass flow meter, since a part of the fluid to be measured is to be taken out of the tube in which the fluid is flowing and the mass of the fluid is measured in a detection member which is outside of the tube, it is impossible to measure the mass of a fluid which might change with the temperature and pressure thereof at the exterior of the tube.

In this invention, a plurality of impellers rotating freely are attached to a well known flow meter of buoyancy type and the impellers rise in accordance with the flow of a fluid to be measured and rotate steadily in proportion to the velocity of the fluid. A radiant ray source is provided which is emitting radiant energy around the rotating axis of the flow meter in synchronization with the rotational velocity and the rotational velocity is detected by means of the radiant energy so that the mass of the fluid can be measured.

Therefore, an object of this invention is to provide a method for measuring a mass only by measuring the velocity of the flow.

Another object of this invention is to provide a method for measuring a mass in which the velocity of the flow can be measured within the tube in which the flow is passing through.

A further object of this invention is to provide a method for measuring a mass in which a radiant energy source is provided to detect the rotation velocity of the impellers of the flow meter.

Figure 1:
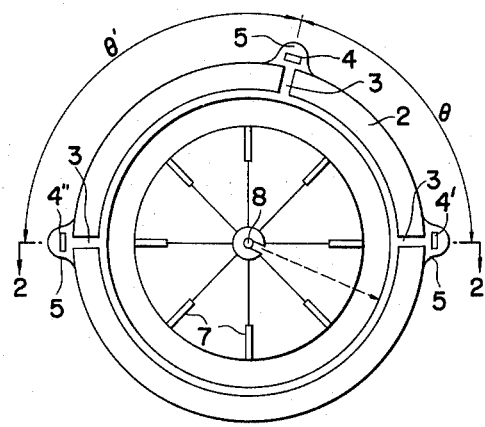
Figure 2:
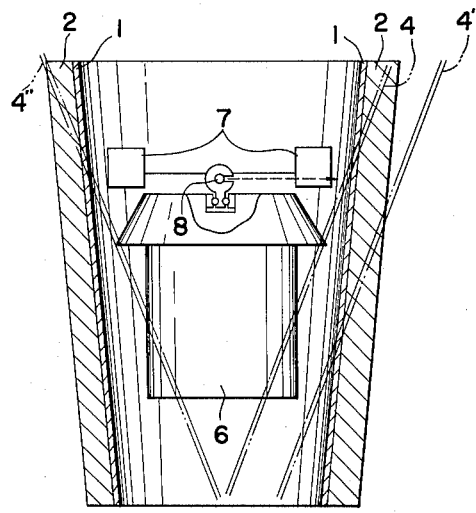
Figure 3:
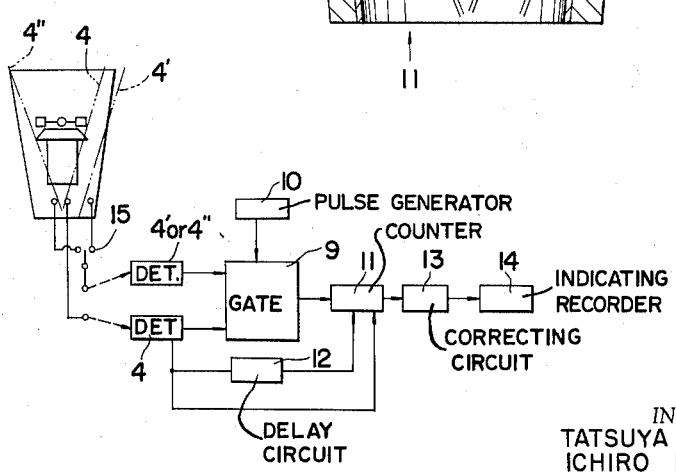

The objects and advantages of this invention wil become readily apparent from the following detailed description taken in connection with the accompanying drawings, in which:

FIG. 1 is a plan view in section of an embodiment of the flow meter provided in accordance with this invention, FIG. 2 is the elevation view in longitudinal section taken along the line 2—2 of the embodiment shown in FIG. 1, and FIG. 3 is the connection diagram of the recording apparatus which can measure the mass and the mass flow alternatively by switching over the flow meter shown in FIG. 1.

The operation of the flow meter provided in accordance with this invention is explained as follows using some formulae.

When a fluid having mass $m$ is passed through tapered tube 1 from the bottom to the top as shown by arrow 11 in FIG. 2, float 6 floats up to the point A which is determined by the flow velocity V in Equation 1 and impellers 7 rotate in proportion to the flow velocity V.

$$V = C\sqrt{\frac{2_g W_f}{m}} \quad (1)$$

where
$W_f$ = weight of float 6
$C$ = flow coefficient
$g$ = acceleration of gravity Equation 1 is modified as follows:

$$\frac{CK_2}{v} = \sqrt{m} \quad (2)$$

where $K_2 = \sqrt{2_g W_f}$ (constant)

The rotational angle $\theta$ of two detectors 4 and 4' for the radiant energy is determined by Equation 3 as follows:

$$\theta \alpha C K_2 \quad (3)$$

Then, Equation 2 is modified as follows:

$$\frac{\theta}{V} = t \alpha \sqrt{m}$$

where $t$ = the time necessary for impellers 7 to traverse the angle $\theta$ with the velocity V Therefore, the mass $m$ and the value $\sqrt{m}$ are obtained by measuring the time $t$ in which a point on an impeller 7 traverses the angle $\theta$ between radiant energy detectors 4 and 4'. The time $t$ is measured by detecting the pulse interval which is generated each time when the radiant energy coming from radiant energy source 2 strikes detectors 4 and 4'. The time $t$ is determined by the interval from the point when detector 4 receives the radiant energy to the point when detector 4' receives the radiant energy, the angle between detectors 4 and 4' being $\theta$, as stated above.

In FIGS. 1 and 2, a plurality of slits 3 are provided on shield 2 made of lead and affixed to tapered tube 1 made of metal. Radiant energy detectors 4, 4' and 4" are mounted along slits 3 and the angle between detectors 4 and 4' is $\theta$ and the angle between detectors 4 and 4" is $\theta'$. Other shields 5 made of lead prevent the radiant energy coming out to detectors 4, 4' and 4" from going outward. Impellers 7 are provided on float 6 and can rotate in proportion to the flow velocity. A radiant energy source 8 is embedded in the center of the axis of the impellers and radiates the radiant energy only in one direction, as shown in FIGS. 1 and 2 at the broken line. The connection diagram shown in FIG. 3 is utilized to measure the time $t$ between the pulses generated each time the radiant energy source strikes detectors 4 and 4' and to indicate and record the mass.

In FIG. 3, a change over switch 15 for the pulsed signals of mass and mass flow is connected to radiant energy detector 4' for measuring mass. The input coming from radiant energy detectors 4 and 4' or 4" and the input coming from pulse generator 10 are applied to gate 9 and the output of gate 9 is supplied to counter 11. The output of a delay circuit 12 is connected to counter 11 and the input of delay circuit 12 comes from detector 4. The output of counter 11 is connected to correcting circuit 13 and correcting circuit 13 is connected to indicating recorder 14.

The operation as the mass meter of the connection shown in FIG. 3 is explained as follows: from the time when the pulses generated in radiant energy detector 4' open gate 9 to the time when the pulses generated in radiant energy detector 4 close gate 9, the clock pulses coming from pulse generator 10 are applied to counter 11. The output of counter 11 is applied to indicating recorder 14 through correcting circuit 13. The pulses generated in radiant energy detector 4 close gate 9 and are applied to counter 11 through delay circuit 12 and reset the counter.

As stated above precisely, in this invention a float with impellers is provided in a tapered tube and when a fluid having mass $m$ is passing through the tube, the float floats up and stops at a fixed point in proportion to the flow. As the impellers rotate in proportion to the velocity of the flow at the point the float stops, if the angle between two radiant energy detectors is determined to satisfy, $$\theta \alpha C\sqrt{2_g W_f}$$

the mass $m$ can be obtained in a form $\sqrt{m}$ by only measuring the time $t$ during which the radiant energy source traverses the angle $\theta$. In order to measure the time $t$ the radiant energy source and the radiant energy detectors are used, and therefore, the mass of a high temperature and high pressure fluid such as steam can be measured as well as the ordinary gaseous fluid.

In the conventional mass flow meter the accuracy of the mass flow cannot be checked simply and in order to check the accuracy an ordinary flow meter, such as, an orifice or a flow velocity meter is provided in the tube in which the mass flow meter is mounted. If necessary, a pressure gauge, a thermometer or an analytic meter is also provided. The mass $m$ of the fluid is calculated by means of the value obtained by the meter, described above and the value of mass $m$ is compared with the value $mV$ obtained by the conventional meter so that the accuracy of the measured value is tested.

Therefore, a still further object of this invention is to provide a mass flow meter in which no velocity meter and mass flow meter are used in order to obtain the mass flow of a fluid. It is recognized that the mass $m$ of the fluid is calculated by means of the value gained from the conventional mass flow meter and is compared with the value $\sqrt{m}$ obtained from a mass meter. When the mass $m$ coincides with the value $\sqrt{m}$, the value measured by the mass flow meter is correct. The mass flow meter uses a combination of radiant energy detectors 4 and 4″, as shown in FIGS. 1 and 2. In FIG. 3, the connection of switch 15 is changed over from detector 4′ to detector 4″ then the apparatus operates to measure the mass flow of a fluid.

The operation as the mass flow meter of the connection shown in FIG. 3 is explained as follows: When a fluid having mass $m$ is passing through tapered tube 1 from the bottom to the top as shown by arrow 11 in FIG. 2, float 6 floats up to the point A which is determined by the flow velocity V in Equation 1 and impellers 7 rotate in proportion to the flow velocity V.

$$V=C\sqrt{\frac{2_g W_f}{m}} \qquad (1)$$

where $W_f$=weight of float
$C$=flow coefficient
$g$=acceleration of gravity

Equation 1 is modified as follows:

$$\frac{C^2 K_3}{V}=mV \qquad (4)$$

where $K_3=2_g W_f$ (constant)

Assuming that the area in which the fluid is passing through at the point A is $a$, Equation (5) is obtained.

$$\frac{aC^2 K_3}{V}=mVa \qquad (5)$$

The angle $\theta'$ between radiant energy detectors 4 and 4″ is now determined to satisfy Equation 6.

$$\theta' \alpha aC^2 K_3 \qquad (6)$$

Then Equation 5 is modified as follows:

$$\frac{\theta'}{V}=t'\alpha mVa$$

where $t$=the time in which impellers 7 traverse the angle $\theta'$ at the velocity V In conclusion, if the time $t'$ in which a fixed point on impellers 7 of float 6 traverses the angle $\theta'$ between radiation energy detectors 4 and 4″, is measured, the mass flow $mVa$ can be obtained.

The angle $\theta$ between radiation energy detectors 4 and 4′ for measuring the mass shown in Equation 3 differs from the angle $\theta'$ between radiation energy detectors 4 and 4″ for measuring the mass flow shown in Equation 6 as follows:

$$\theta \alpha CK_2$$
$$\theta' \alpha aC^2 K_3$$

Therefore, if no error is contained in measuring the angle $\theta$ and $\theta'$, when the time $t$ in which a fixed point on the impellers traverses from detector 4 to detector 4′ is correct, the time $t'$ in which a fixed point on the impellers traverses from detector 4 to detector 4″ should be correct. In other words, the value $\sqrt{m}$ of a fluid measured by the mass meter of the areal type of this invention coincides correctly with the mass $m$ measured by the well known pressure gauge, if necessary together with the well known thermometer and the analyzer, then it can be ascertained that the value $mVa$ measured by the mass flow meter of the areal type of this invention is also correct. In addition to this fact, if the switch 15 is arranged to change over its contact at short time intervals automatically and constantly, the mass $\sqrt{m}$ and the mass flow $mVa$ can be recorded continuously by means of only one meter of this invention.

From the above description it can be seen that the measuring method of the subject invention can measure the mass and the mass flow of a fluid only by measuring the velocity of the flow which is passing through a tapered tube. While some preferred embodiments of the present invention are disclosed in the figures, it is recognized that the scope of the present invention is not limited thereto and it is therefore intended that the scope of the present invention be defined by the scope of the appended claims.

What is claimed is:

1. A method for obtaining a measure of the mass of a flowing fluid, comprising the steps of passing the fluid through a vertical tapered tube to displace and rotate a float therein by amounts dependent upon the velocity of the fluid, measuring the time period required for the float to rotate through a given angle which is determined by the extent of said displacement, and indicating said time period as a predetermined function of the mass of the fluid to provide a measure of said mass.

2. A method for obtaining a measure of the mass and a measure of the mass flow of a flowing fluid, comprising the steps of passing the fluid through a vertical tapered tube to displace and rotate a float therein by amounts dependent upon the velocity of the fluid, measuring the time period required for the float to rotate through a first angle which is determined by the extent of said displacement, indicating said time period as a predetermined function of the mass of the fluid to provide a measure of said mass, measuring the time period required for the float to rotate through a second angle which is determined by the extent of said displacement, and indicating the last mentioned time period as a predetermined function of the mass flow of the fluid to provide a measure of said mass flow.

3. A method as specified in claim 2 including the additional step of measuring the first and second mentioned time periods alternately in continuous rapid succession to provide substantially continuous measures of said mass and said mass flow.

4. A method as specified in claim 2 including the additional steps of independently deriving a checking measure of the mass of the fluid of known accuracy, and comparing said mass measure of known accuracy with the measure of said mass derived from the first mentioned time period to determine the accuracy of the last mentioned measure and hence of the measure of said mass flow derived from the last mentioned time period.

References Cited by the Examiner

UNITED STATES PATENTS

| | | | |
|---|---|---|---|
| 2,554,715 | 5/1951 | Mellett | 73—209 |
| 2,767,580 | 10/1956 | Bevins et al. | 73—453 X |
| 3,000,210 | 9/1961 | Faure-Herman | 73—231 |
| 3,131,559 | 5/1964 | Cooper | 73—194 |

RICHARD C. QUEISSER, *Primary Examiner.*

DAVID SCHONBERG, *Examiner.*

EDWARD D. GILHOOLY, *Assistant Examiner.*